Aug. 19, 1941.    E. M. WATKINS ET AL    2,253,408
MOTOR DRIVEN VEHICLE
Filed June 28, 1939    4 Sheets-Sheet 3

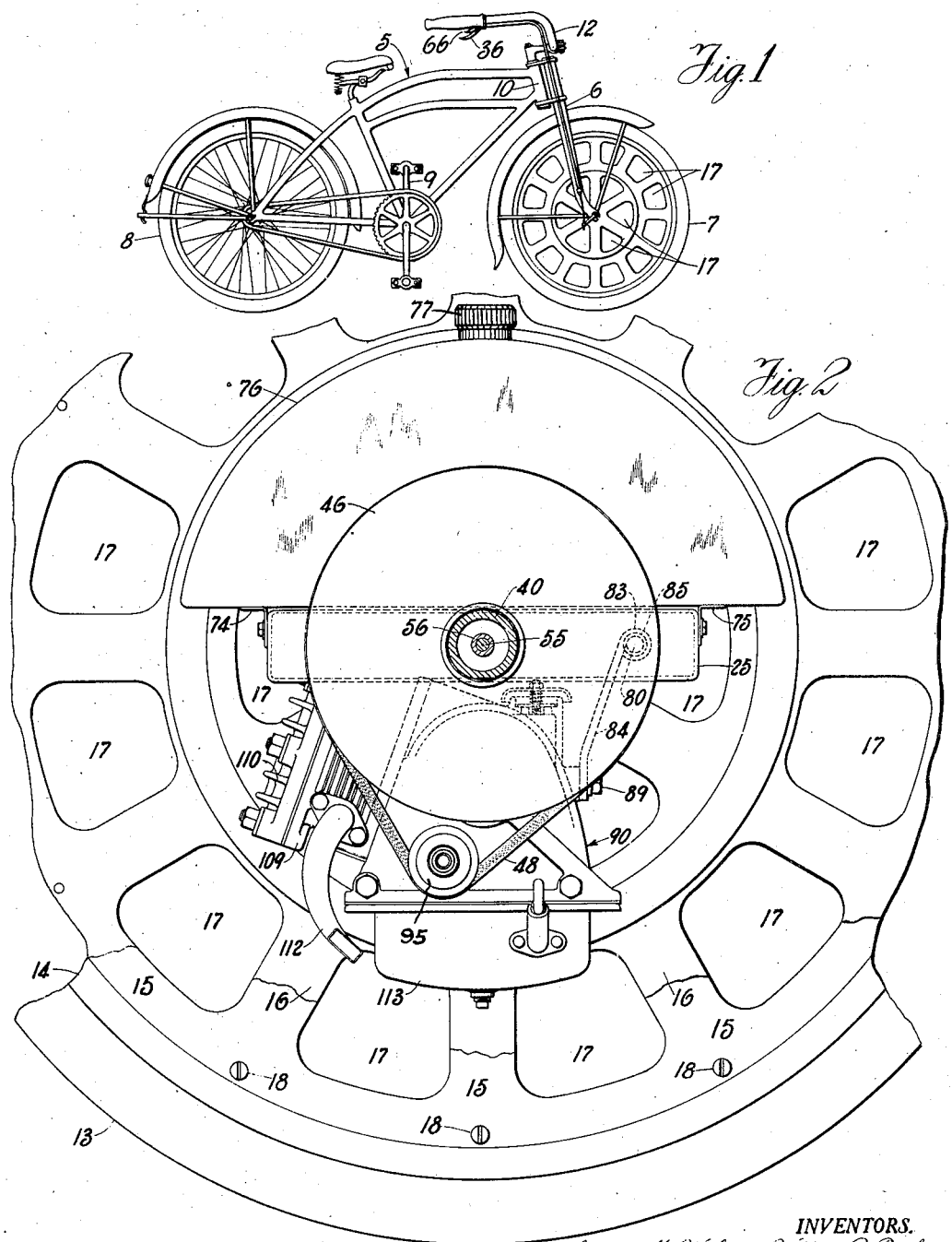

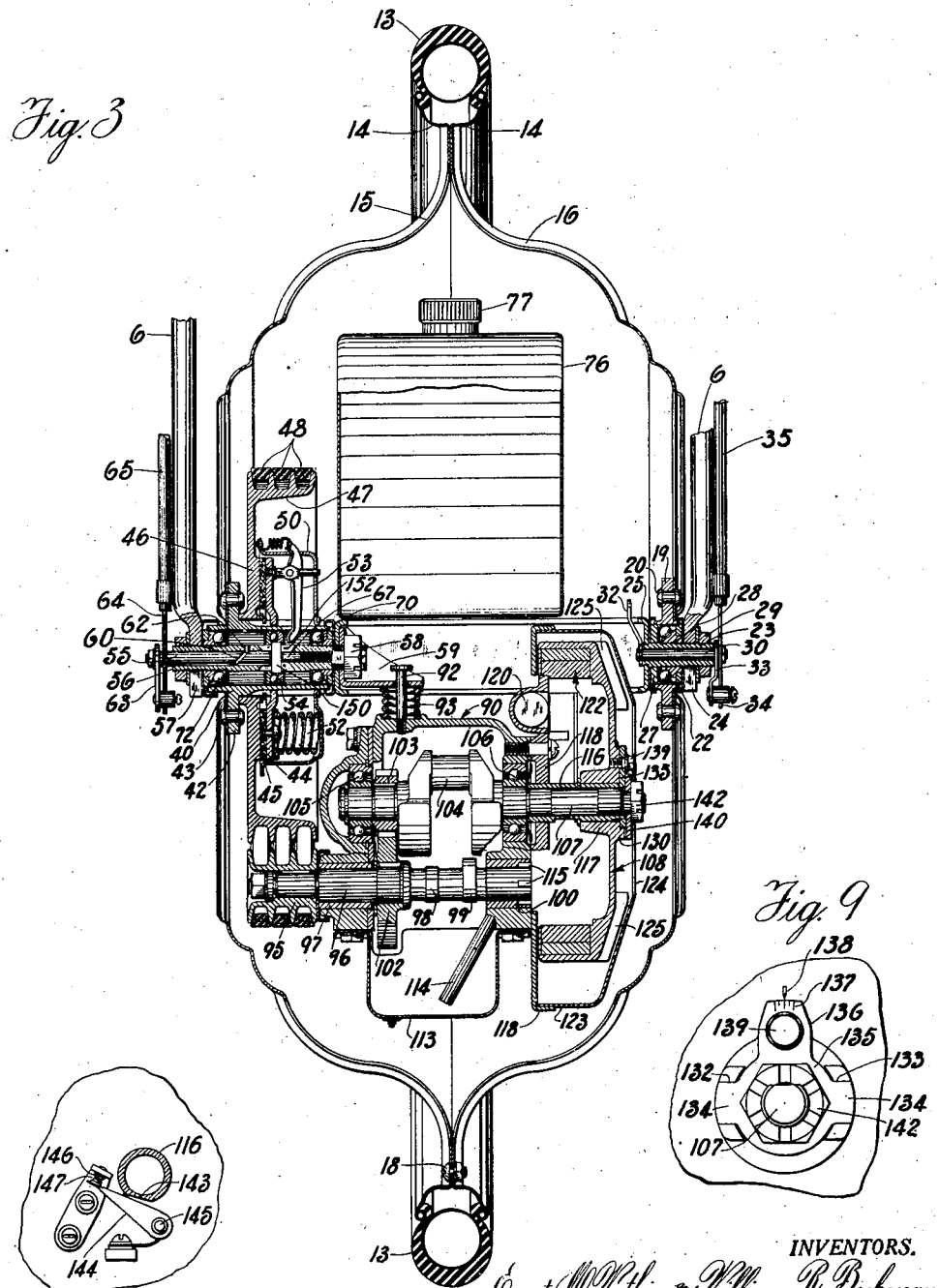

INVENTORS.
Ernest M. Watkins and William R. Beckman
BY Walter E. Schirmer
ATTORNEY Aug. 19, 1941.  E. M. WATKINS ET AL  2,253,408
MOTOR DRIVEN VEHICLE
Filed June 28, 1939  4 Sheets—Sheet 4
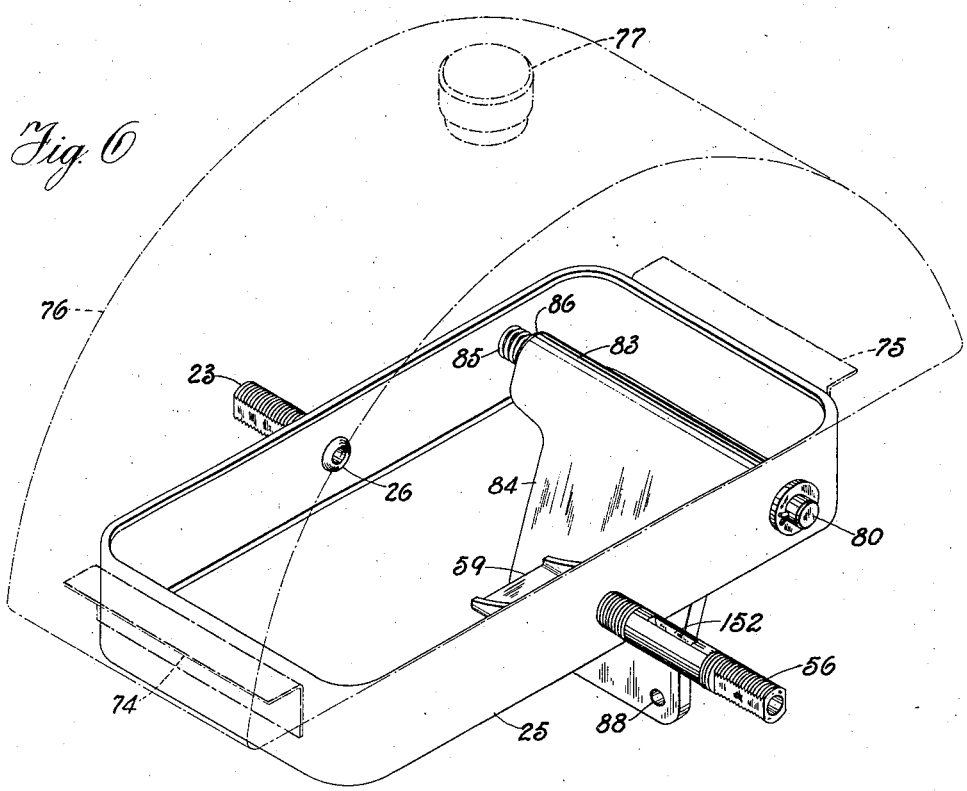
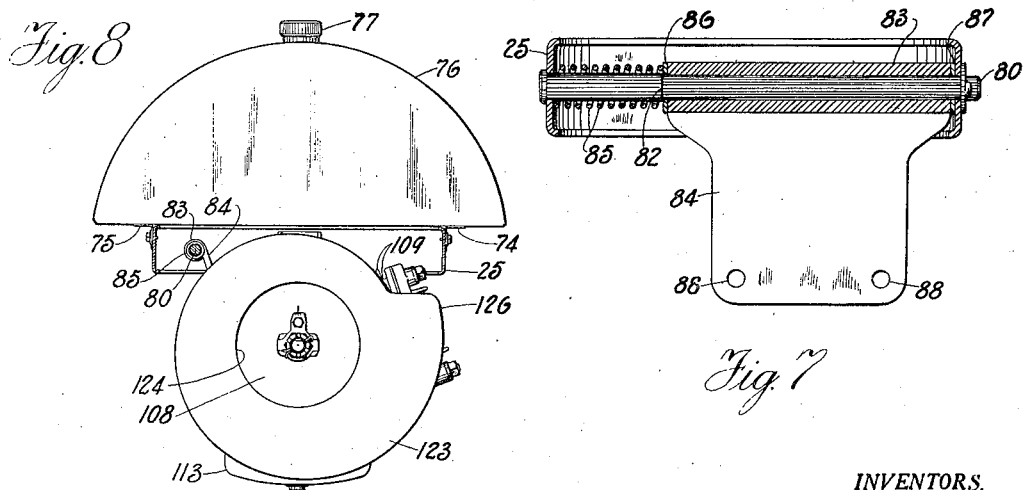
INVENTORS.
Ernest M. Watkins and William R. Beckman
BY Walter E. Schirmer
ATTORNEY Patented Aug. 19, 1941

2,253,408

UNITED STATES PATENT OFFICE 2,253,408

MOTOR DRIVEN VEHICLE

Ernest M. Watkins and William R. Beckman, South Bend, Ind.

Application June 28, 1939, Serial No. 281,600

15 Claims. (Cl. 180—33)

This invention relates to motor driven bicycles of the type in which the motor is mounted in the forward wheel of the vehicle, although it is to be understood that other mounting or location can be employed if so desired.

One of the primary objects of the present invention is to provide a motor driven bicycle in which the motor with its accessory parts is entirely enclosed within two disc-like plates which form the spoked wheel body portion of the bicycle wheel, the arrangement being such that the entire assembly can be removed from the fork for inspection, adjustment or repair when desired by merely removing one of the enclosing plates.

Another feature of the present invention is the provision of a cradle member supported between the fork of the bicycle frame and acting as a support for the motor, the motor being suspended therefrom and so arranged as to have cushioned relative movement with respect to the cradle to accommodate jolts and bumps as the vehicle is being driven.

Still another feature of the present invention is the employment of a gear reduction between the motor and the driving shaft, the driving shaft in turn constituting a cam shaft for the motor and connected for transmitting driving torque to the wheel axle by means of a multiple V belt drive. The pulley, which is connected to a disc-like plate of the wheel and driven from the motor, is of such form as to enclose a clutching mechanism which couples or uncouples this pulley from the driving axle. This clutch mechanism is arranged to be operated by remote control, and in itself contains several innovations of design which will be more clearly explained hereinafter.

Still another feature of the present invention is the arrangement of the crankshaft, the flywheel and the axis of rotation of the bicycle wheel in such manner that the gyroscopic forces set up have a tendency to maintain the wheel in a vertical position and facilitate the balancing of the bicycle when the motor is driving the same.

Still another advantage secured by the present invention is the provision of an arrangement whereby the direction of rotation of the driving mechanism is such as to maintain a desired tension upon the V belt drive and tend to prevent possible play in this drive to eliminate, as far as possible, any difficulties in this connection.

Still another feature of the present invention is the incorporation of the fuel supply tank directly on the cradle whereby gravity feed can be employed for the motor and the tank takes up no room that could otherwise be utilized.

A further feature of the invention is the provision of a flywheel which contains the starting magneto, and also is so designed as to direct a blast of cool air over the cylinder block and head of the motor during operation. In this connection, there is incorporated into the structure a novel type of timing arrangement which can be readily adjusted without requiring disassembly of the magneto structure.

Other objects and advantages of the invention will appear more fully from the following detailed description which, taken in conjunction with the accompanying drawings, will disclose to those skilled in the art the particular construction and operation of the preferred form of the present invention.

In the drawings:

Figure 1 is a side elevational view of a bicycle constructed in accordance with the present invention;

Figure 2 is an enlarged view with one side plate removed of the vehicle wheel which houses the motor for driving the bicycle;

Figure 3 is a sectional view taken transversely through the wheel of Figure 2;

Figure 6 is a perspective view showing in detail the cradle for supporting the motor and fuel supply tank;

Figure 7 is a detailed sectional view of the plate mounting for supporting the motor from the cradle;

Figure 8 is a diagrammatic view from the opposite side of the wheel from that shown in Figure 2 showing the outline of the motor and cradle assembly, and also showing the cooling shroud for the motor;

Figure 9 is an end elevational view of the timing mechanism; and

Figure 10 is a partial sectional view of the mechanism shown in Figure 9.

Figure 5:
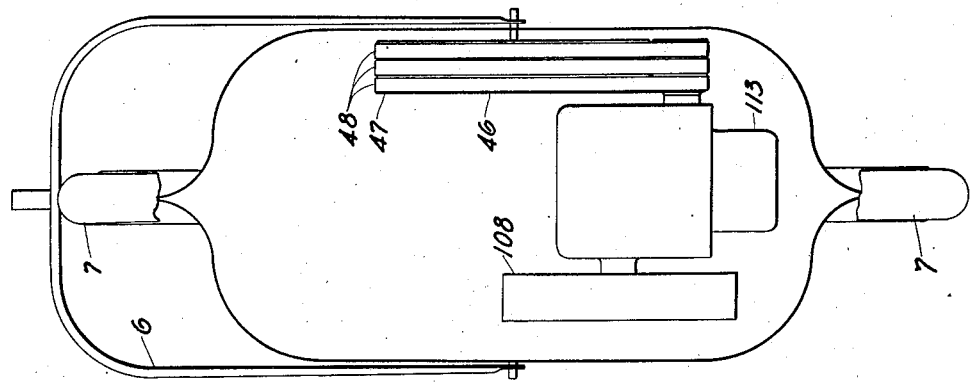
Figure 5 is a view at right angles to Figure 4 showing the same relationship.

Considering now the drawings in detail, a bicycle is indicated generally at 5 having the steering fork 6 upon which is supported a motor driven wheel 7 having the conventional rear wheel 8 which is capable of being rotated from the pedal assembly 9. The bicycle is also provided with the steering collar 10 controlled from the handle bars 12.

The motor driven wheel 7 comprises a tire member 13 which is supported upon a rim 14 formed by two corresponding peripheral flanges of two side plates 15 and 16.

The side plates or discs 15 and 16 have portions thereof notched out to provide the spoke-like openings 17 shown in Figures 1 and 2, and are preferably held together by locking bolts 18 arranged in a circumferential series adjacent the rim flange portions 14. The bolts 18 are arranged for removal so that the side plates may be taken off when it is desired to inspect or adjust the motor. These plates may be formed of thin aluminum or light steel stampings, or may be spun, and preferably are provided with a partially corrugated surface in order to increase the strength and rigidity thereof.

At its center the plate 16 is provided with an opening within which is mounted the bearing member 19 as by means of a plurality of rivets 20. The member 19 is adapted to be journalled upon a ball bearing assembly 22, which in turn is secured about a threaded sleeve 23 extending through the fork 6 of the bicycle frame and having a flattened portion whereby it is locked against rotation within the fork end 24 of the fork 6. The sleeve 23 has a reduced inner end which provides a shouldered support for one end of the cradle member 25, the end of the sleeve being spun over as indicated at 26 in Figure 6 to secure the cradle member in non-rotative position with respect thereto. A suitable end thrust member 27 is provided on the sleeve 23 and bears against the dust protector engaging the lateral surface of the cradle 25. The inner bearing race 28 is threaded on the sleeve 23 to a sufficient distance to provide proper positioning of the bearing assembly 22, and is locked in position by means of the clamping nut 29 threaded onto the sleeve 23 outwardly of the engagement of the fork 6 therewith. This provides an adjustable bearing assembly which may be locked in any desired adjustable position and serves as one support to provide for the rotation of the wheel about the axis of the sleeve 23.

Extending through the sleeve 23 and rotatable therein is the control shaft 30 which, at its inner end, has the lever 32 secured thereto and connected in any suitable manner to a throttle control mechanism for the carburetor of the motor, which has not been shown for the sake of simplicity. At its outer end a second lever 33 is provided to which is connected the control wire 34 leading through the cable 35 to a suitable control lever 36 mounted on one of the handle bars of the bicycle. The cable 35 may be supported in any suitable manner along the fork 6 of the bicycle and through the handle bars 12 to the control lever mounting 36. It will be seen that longitudinal movement of the wire 34 will result in rotation of lever 32 to open or close the throttle of the motor. A suitable control wire may pass through the shaft 30 to provide for choking the carburetor during starting.

The opposite plate 15 is provided with a central aperture adapted to receive the sleeve 40, which has the radial flange 42 projecting therefrom and secured to the sleeve by means of the rivets 43. The sleeve 40 is provided with a splined external surface upon which is slidably mounted the clutch plate 44 carrying a friction surface member 45 which is adapted to engage the inner surface of the pulley or sheave 46 rotatably mounted about the sleeve 40. The pulley 46 is provided with an overhanging axially directed portion indicated at 47 which is grooved to receive the multiple V belt assembly 48, whereby the pulley is connected to the driving shaft of the motor.

A clutch housing 50 is provided, which is supported in any desired manner on the splines of the sleeve 40, and is recessed at certain points to provide spring seats for the clutch springs 52, which normally urge the clutch plate 44 against the pulley 46. Intermediate each of the springs 52 is a clutch throwout lever 53, the inner ends of which are directed radially inwardly into the interior of the sleeve 40 through slots in such sleeve. The inner ends of the throwout levers 53 are thereby adapted to be engaged by a clutch throwout bearing 54 which is mounted for reciprocation within the sleeve 40 and which is actuated by the clutch operating shaft 55. This shaft is rotatably and longitudinally movable within a sleeve member 56 secured against rotation in the forked end 57 of the bicycle fork 6, and at its inner end terminates in a threaded portion projecting through the lateral wall of the cradle 25 and adapted to receive the lock nut 58, whereby the angle bracket 59 is securely clamped to the inner face of the cradle. The shaft 55 is provided with a spiral slot 60 adapted to receive the inner end of a pin 62 carried in the sleeve 56. Upon rotation of the shaft 55 the groove will be guided along the pin 62 and will thus move the shaft 55 inwardly through the sleeve 56 to force the clutch throw-out bearing against the inner ends of the clutch throw-out levers, thereby rotating these levers to move the clutch plate 44 out of clutching engagement with the pulley 46. The control of the clutch through the shaft 55 is effected by means of a lever 63 secured to the outer end of the shaft and having secured thereto the flexible wire 64 which is trained through the conduit 65 to a suitable control lever 66 mounted on the handle bars of the bicycle, and therefore is under the ready control of the operator. Longitudinal movement of the wire 64 under the control of lever 66 will result in rotating the shaft to engage or disengage the clutch. A suitable spring pressed plunger 67 is biased against the movement of the shaft 55 so as to return the clutch throw-out bearing against the shaft 55 when moved to clutch engaging position.

Suitable bearing assemblies 70 and 72 serve to mount the sleeve 40 rotatably on the sleeve 56 so that the wheel is thereby journalled between bearing members 19 and sleeve 40 for rotation about the two fixed sleeves 23 and 56. Suitable means, as disclosed in Figure 2, are provided for adjustment of the bearings 70 and 72, the inner races of these bearings being capable of axial movement by threading them along the sleeve 56, and they can then be secured in position by means of the usual lock nut arrangement.

Considering now Figure 6 which shows in detail the cradle member 25, this member may be formed of channel shaped stock rolled into rectangular form and having its adjacent ends butt welded or otherwise rigidly secured together. The semi-cylindrical fuel supply tank indicated generally at 76 has angle-shaped brackets 74 and 75 secured thereto and said brackets are bolted or otherwise secured to the end faces of cradle member 25, thus providing supporting means for said tank. The tank 76 has the usual filler opening 77 which is accessible through one of the openings 17 in the disc for the purpose of filling the same with gasoline or the like.

Considering now the relationship between the cradle and the motor, it will be noted that adjacent one end, the cradle is provided with a transverse shaft 80 having a shouldered portion 82 adjacent one end thereof. The shaft 80 is adapted to receive and pivotally support the thickened end 83 of a support plate 84, this plate extending downwardly and at a slight angle with respect to the vertical plane. A suitable spring 85 is biased about the larger diameter portion of the shaft 80 and bears against a thrust washer 86 at the edge of the plate whereby the plate is normally urged to the right, as viewed in Figure 7, the spring serving to prevent rattling of the plate and normally urging it into position so that the thrust washer 87 at the opposite end thereof is pressed against the inner surface of the cradle. At its lower end, the plate is provided with two openings 88 through which bolts are adapted to extend, as indicated at 89 in Figure 2, for clamping the motor housing indicated generally at 90 thereto. The angle bracket 59 which extends interiorly of the cradle, as clearly shown in Figures 3 and 6, is adapted to receive the headed pin 92 which is bolted into the upper end of the motor housing, and which has relative movement, both laterally and longitudinally, with respect to the angle bracket 59. A suitable spring 93 is seated on the top of the motor housing, and bears against the under surface of the bracket 59 about the pin 92, normally urging the motor housing downwardly in a direction so that the same tends to pivot about the shaft 80 as a center. This imparts tension to the V belts 48 which are trained about the driving pulley 95 secured in any suitable manner to the driving shaft 96 of the motor. The driving shaft 96 of the motor extends through a bearing sleeve portion 97 formed in the side face of the housing 90, and within the motor is provided with offset cam portions 98 and 99 for operating the valves of the engine. The opposite end of the shaft is journalled in a suitable bearing member 100 on the opposite side of the motor housing. It will therefore be apparent that the spring 93 forces the motor downwardly about the shaft 80 as a center to maintain a certain predetermined tension upon the belts 48 so that there will be no slippage or slack in these belts and proper torque transmission can be effected.

The shaft 96 is provided with a gear 102 keyed thereto, which is adapted to have meshing engagement with gear 103 carried on the crankshaft 104 of the engine. The crankshaft 104 is mounted in suitable anti-friction bearings 105 and 106, and has a projecting end 107 which forms the supporting shaft for the flywheel, indicated generally at 108. Within the housing 90 the crankshaft is provided with the offset crank portion to which is secured the connecting rod connected to the piston operating in the cylinder indicated generally at 109. The cylinder 109 is provided with radial fins which act as heat dissipating means for cooling the cylinder and piston during operation of the engine, air being circulated over these fins to draw the heat therefrom in a manner that will be described in detail hereinafter.

Mounted at the end of the cylinder block 109 is the cylinder head 110 which is secured thereto by cap screws or the like and which contains the spark plug for igniting the fuel introduced therein by the valves operated by the cams 98 and 99.

A suitable exhaust manifold 112 is connected to the exhaust port of the cylinder and has its discharge openings at a point laterally disposed away from the crank case pan 113 of the engine. The carbureter is mounted adjacent the fuel supply tank and supported on an intake manifold, the outlet of which communicates directly with the intake valve opening in the cylinder. This arrangement has not been shown for the sake of clarity as it forms no part of the present invention.

It will be noted from Figure 3 that an angularly extending conduit 114 projects toward the bottom of the crank case 113, and the upper end of this conduit discharges adjacent the oil pump indicated generally by the vanes 115 mounted at the end of the cam shaft 96. In this manner, oil is circulated under pressure to the bearings 105 and 106 through suitable oil passageways, not shown, and also to the bearings for the cam shaft 96.

The extending portion 107 of the crankshaft is provided with a sleeve 116 upon which the hub 117 of the flywheel 108 is adapted to be mounted. Bolted to the side face of the motor housing 90 is the plate 118 supporting the ignition coil assembly 120, which cooperates with the magnet structure indicated generally at 122 carried within the flywheel, whereby the engine derives its electrical spark. The plate 118 also is provided with an outer peripheral flange to which is secured a shroud member 123 enclosing the flywheel housing and of a generally volute shape, the shroud member 123 having the central outer opening 124 through which air is drawn by means of the blades or fins 125 formed on the flywheel. The air thus drawn in through the opening 124 is directed radially about the flywheel and then is directed inwardly across the surface of the cylinder 109 through the outlet portion 126 of the volute shroud, thereby serving to discharge cool air over the cylinder walls to maintain the engine at the desired operating temperature.

The hub of the flywheel 108 is provided with a boss portion 130 having diametrically opposed slotted out portions 132 and 133 adapted to receive the projecting wing portions 134 of a timing adjustment member 135 which is secured about the extension of the shaft 107 and is splined or otherwise keyed to the sleeve 116. The member 135 has a projection 136 marked with suitable graduations, indicated at 137, adapted to cooperate with an indicator projection 138 mounted within the face of the flywheel. A suitable adjusting bolt or screw 139 extends through the projection 136 and may be loosened to allow rotation of the member 135 within the limits defined by the slotted portions 132, this adjustment preferably being limited to 10 degrees for the purpose of adjusting the timing of the motor. The member 135 is secured in position over the hub of the flywheel by means of the washer 140 and the lock nut 142.

As shown in Figure 10, the sleeve 116 is provided with a flattened portion 143 so that upon rotation of the member 135 the sleeve is rotated therewith to vary the angular relationship of the flatted portion 143 with respect to the breaker arm 144, mounted on a conventional pivot 145, and having the contact 146 at one end thereof adapted to engage the ignition contact 147. By means of this adjustment the angular position at which the contact is made and broken can be shifted by adjustment of the member 135 within the limits described, and thus the proper timing of the engine can be obtained without requiring disassembly of the flywheel mechanism.

It should be noted that the clutch mechanism includes a cross pin 150 engaging the clutch throw-out bearing 54, and is operable within the slots 152 formed in the sleeve journal member 56 so that upon longitudinal movement of the plunger or control shaft 55, the throwout bearing is forced against the inner ends of the clutch arms 53 to disengage the clutch plate 44 from the pulley 46.

In the operation of the mechanism thus far described, the rider of the bicycle drives the bicycle by the usual pedal action to gain sufficient speed for starting of the motor. This starting is produced by engaging the clutch, thereby driving from the pulley 46 due to rotation of wheel 7 through the came shaft 96 to the crankshaft of the engine. As the flywheel is thus driven, the engine fires, and from this point on the vehicle is driven by the motor. The speed of the vehicle is controlled through the control member 36 which actuates the throttle valve of the carbureter.

Figure 4:
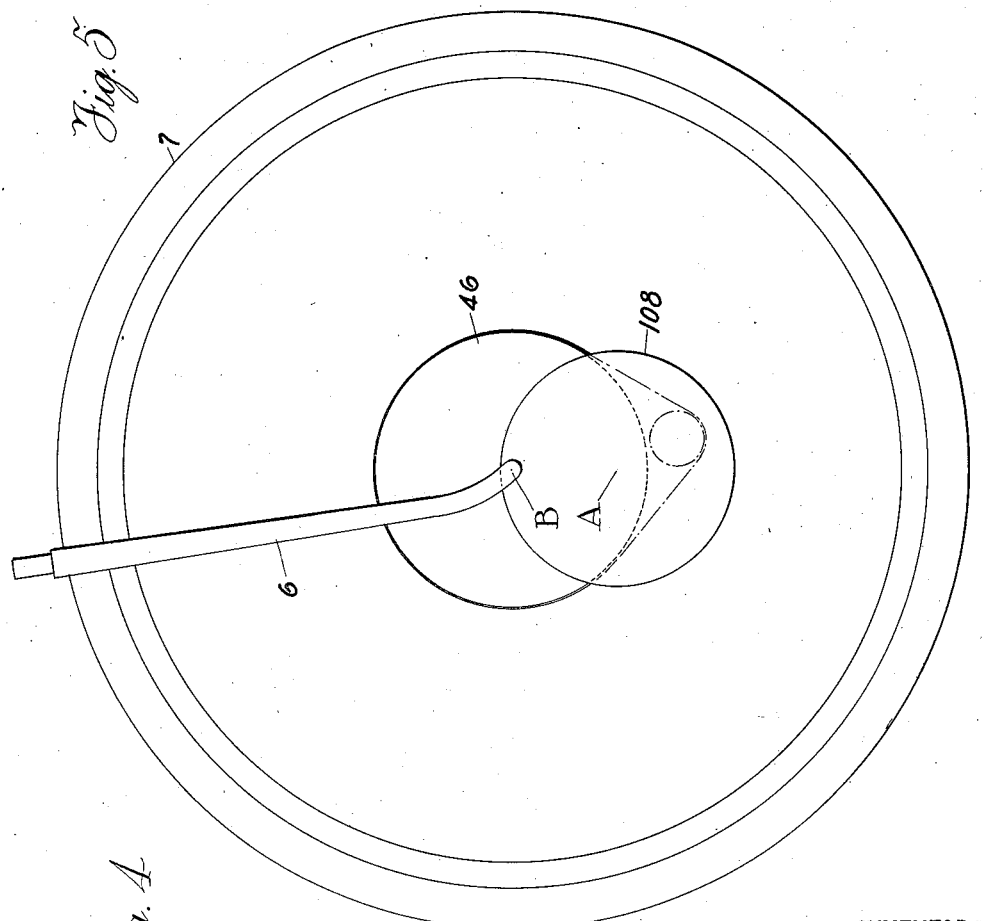
Figure 4 is a more or less diagrammatic view showing the relationship of the centers of rotation of the various moving parts with respect to the fork of the bicycle.

It will be noted from an inspection of Figures 4 and 5 that the arrangement of the flywheel center of rotation and of the wheel center of rotation is such that the flywheel is below center, as indicated by the point A, whereas the center of rotation of the wheel is indicated at B. Also, it will be noted that the pulley and drive belt connection is at the opposite side of the wheel from the flywheel, thereby providing a substantially balanced construction in which the weight is equally distributed so that there is no tendency of the vehicle to veer in either direction. Further, it should be noted that the rotation of the flywheel is in a direction opposite to the rotation of the wheel and sets up a gryroscopic effect tending to maintain the vehicle in a stable vertical position. The gyroscopic recession upon tilting of the vehicle is in a direction forwardly of the axis of rotation, and this reaction works in the opposite direction to the deviation from the straight line caused by the tilting movement, thereby tending to keep the wheel in a straight line. While this introduces an additional force which must be overcome in order to turn the bicycle, nevertheless, it adds a great amount of stability and is especially important at the speeds at which the bicycle can be driven by the motor. Also, the positioning of the motor in the front wheel serves to more equally distribute the weight, since the major portion of the weight of the operator is over the rear wheel and is offset by the weight of the motor on the front wheel.

It is therefore believed apparent that we have provided a motor driven bicycle of novel design having distinct advantages insofar as compactness and size of the motor driven parts are concerned, and which can be easily assembled or disassembled for inspection, repair or replacement.

We do not intend to be limited to the specific details of construction herein illustrated and described in connection with the preferred forms of our invention, but only insofar as defined by the scope and spirit of the appended claims.

We claim:

1. In a vehicle having a chambered road wheel, a fork for supporting said wheel, a rectangular cradle secured to said fork and forming a journal for the wheel, a motor pivotally suspended from adjacent one end of said cradle, means forming a resilient connection between said motor and a point on said cradle spaced from said end, a drive pulley on said motor, a pulley mounted coaxially of said wheel, a belt driven from said first pulley and driving said second pulley, clutch means for coupling said second pulley to said wheel, said resilient connection means normally urging said motor about its pivot in a direction to tension said belt.

2. A bicycle having a fork, a chambered wheel journalled in said fork, a cradle fixed between said fork within said wheel, a motor having a drive pulley, means pivotally supporting said motor in depending position from one end of said cradle, a bracket on said cradle having means resiliently holding said motor against swinging movement relative to said cradle, a driven pulley mounted coaxially of and rotatable relative to said wheel, belt means forming a driving connection between said pulleys, and clutch means for coupling said driven pulley to said wheel, said resilient means normally urging said motor about its pivot in a direction to maintain tension on said belt means.

3. A bicycle having a steering fork, a chambered wheel journalled between said fork arms, a cradle secured in fixed position between said arms within said wheel, a depending plate pivotally secured to said cradle, a motor secured to the lower end of said plate, a bracket on said cradle, a resilient connection between said motor and said bracket, a drive pulley on said motor, a driven pulley journalled within said wheel, a multiple belt drive between said pulleys, and clutch means between said driven pulley and said wheel.

4. A bicycle having a steering fork, a chambered wheel journalled between said fork arms, a cradle secured in fixed position between said arms within said wheel, a depending plate pivotally secured to said cradle, a motor secured to the lower end of said plate, a bracket on said cradle, a resilient connection between said motor and said bracket, a drive pulley on said motor, a driven pulley journalled within said wheel, a multiple belt drive between said pulleys, and clutch means between said driven pulley and said wheel, said resilient connection normally urging said motor in a direction to tension said belt drive.

5. A bicycle having a steering fork, a chambered wheel journalled between the fork arms, a rectangular cradle secured against rotation within the wheel, a plate pivotally depending from said cradle, a motor within the wheel secured to the lower end of the plate, a bracket secured in the cradle, spring means between the bracket and motor normally urging the motor downwardly away from the cradle, and a belt drive between the motor and the wheel.

6. A bicycle having a steering fork, a chambered wheel journalled between the fork arms, a rectangular cradle secured against rotation within the wheel, a plate pivotally depending from said cradle, a motor within the wheel rigidly secured to the lower end of the plate, a bracket secured in the cradle, spring means between the bracket and motor normally urging the motor downwardly away from the cradle about the pivot of said plate, a belt drive between the motor and said wheel, and clutch means for coupling said drive to the wheel, said spring acting to maintain the belt drive under tension.

7. A bicycle having a chambered wheel, frame means for journalling said wheel, a motor support secured to said frame means and disposed within said wheel, a motor depending from said support having a crank shaft, a cam shaft driven from said crank shaft and having a driving pulley, a driven pulley journalled coaxially of said wheel, a belt drive between said pulleys, clutch means keyed to said wheel and adapted to engage said driven pulley, and control means for actuating said clutch means extending through the wheel journal and operable from a remote point.

8. The combination of claim 7 wherein said clutch means is disposed within the peripheral limits of said driven pulley and said control means extends axially through the hub of said pulley.

9. The combination, with a vehicle frame having a tubular wheel journal, a chambered wheel having a tubular hub rotatably mounted on said journal, a driven pulley rotatably supported on said hub within the wheel, a clutch plate splined on said hub having a radial clutch surface engageable with said pulley, clutch arms for controlling engagement of said surface having the inner ends thereof extending into said hub, a throwout bearing axially movable on said journal and engaging said arm ends, and an actuating shaft reciprocatory in said tubular journal and engaging said bearing.

10. The combination of claim 9 further characterized in the provision of means for moving said shaft axially in said journal upon rotative movement applied to the outer end thereof.

11. In combination, a bicycle fork having spaced fork arms, a pair of tubular journals secured against rotation in said arms and extending toward each other therebetween, a pair of generally concave discs each having central hub portions rotatably mounted on said journals and facing each other to form a chambered wheel, means for securing the outer peripheries of the wheels together, a rectangular cradle non-rotatably mounted within the wheel on the adjacent ends of said journals, a motor depending from said support, control means for the motor extending through one of said journals, clutch means for clutching the motor to the wheel mounted on the other journal, and control means for said clutch means extending through said other journal.

12. In a bicycle having a steering fork, a chambered wheel rotatably mounted between the fork arms, a cradle rigidly secured to said arms within said wheel, a motor supported by said cradle below the axis of rotation of the wheel, a flywheel disposed at one side of said motor and having its axis of rotation disposed below and forwardly of said wheel axis, a driving pulley driven by said motor and disposed on the other side thereof, a driven pulley journalled within the wheel and coaxially of the wheel axis, a belt drive between said pulleys, and means carried within the wheel for clutching the driven pulley to the wheel.

13. A motor driven bicycle comprising a steering fork, a chambered wheel rotatably mounted therein, a rectangular cradle within said wheel rigidly secured in horizontal position to said fork, a fuel tank mounted on top of said cradle, a motor pivotally mounted in depending position from said cradle, a bracket on said cradle, a post carried by said motor extending through said bracket for limiting downward movement of the motor, belt drive means between the motor and the wheel disposed within the wheel, and spring means about said post between said bracket and motor for tensioning said drive means and absorbing road shocks imparted by said wheel to said motor.

14. In a bicycle having a steering fork, a chambered wheel rotatably mounted between the fork arms, a cradle rigidly secured to said arms within said wheel, a motor supported by said cradle below the axis of rotation of the wheel, a flywheel disposed at one side of and driven by said motor in one direction and having its axis of rotation disposed below and forwardly of said wheel axis, a driving pulley driven by said motor in the opposite direction and disposed on the other side thereof, a driven pulley journalled within the wheel and coaxially of the wheel axis, a belt drive between said pulleys, and means carried within the wheel for clutching the driven pulley to the wheel, said flywheel and said wheel thereby rotating in opposite directions.

15. In a chambered bicycle wheel, a motor support having opposite arms forming wheel journals, one of said journals including a sleeve rotatably mounted on said arm and having an externally splined portion, a motor pivotally carried by said support, a driven pulley rotatable about said sleeve and driven from said motor, a clutch assembly disposed within said pulley including a housing splined on said splined portion of said sleeve, coacting clutch surfaces on said pulley and assembly, and means for actuating said clutch from the outer end of said arm, said actuating means including a throwout bearing assembly carried in and axially shiftable relative to said sleeve.

ERNEST M. WATKINS.
WILLIAM R. BECKMAN.